United States Patent                                                         [11] 3,626,020

| [72] | Inventor | Richard W. Neuzil<br>Downers Grove, Ill. |
|---|---|---|
| [21] | Appl. No. | 806,735 |
| [22] | Filed | Mar. 12, 1969 |
| [45] | Patented | Dec. 7, 1971 |
| [73] | Assignee | Universal Oil Products Company<br>Des Plaines, Ill.<br>Continuation-in-part of application Ser. No. 739,176, June, 1968, now Patent No. 3,558,730, dated Jan. 26, 1971. This application Mar. 12, 1969, Ser. No. 806,735<br>The portion of the term of the patent subsequent to Jan. 26, 1988, has been disclaimed. |

[54] SEPARATION OF PARAXYLENE FROM MIXTURE OF C AROMATIC UTILIZING CRYSTALLINE ALUMINOSILICATE ADSORBENT
20 Claims, No Drawings

| [52] | U.S. Cl. | 260/674 SA, 208/310 |
|---|---|---|
| [51] | Int. Cl. | C07c 7/12, C10g 25/04 |

[50] Field of Search.......................................... 260/674; 208/310

[56]               References Cited
              UNITED STATES PATENTS

| 2,882,243 | 4/1959 | Milton | 252/455 |
|---|---|---|---|
| 3,114,782 | 12/1963 | Fleck et al. | 260/674 |
| 3,126,425 | 3/1964 | Eberly et al. | 260/674 |
| 3,130,007 | 4/1964 | Breck | 252/455 |
| 3,133,126 | 5/1964 | Fleck et al. | 260/674 |

*Primary Examiner*—Delbert E. Gantz
*Assistant Examiner*—C. E. Spresser
*Attorneys*—James R. Hoatson, Jr. and Robert W. Erickson ABSTRACT: A process for the separation of paraxylene from a mixture of at least one other xylene isomer using a synthetically prepared crystalline aluminosilicate adsorbent. A feed mixture comprising at least two xylene isomers is passed through a bed of faujasite adsorbent wherein one xylene isomer is preferentially adsorbed within the adsorbent. A subsequent desorption step is then used to desorb the selectively adsorbed feed component.

SEPARATION OF PARAXYLENE FROM MIXTURE OF C AROMATIC UTILIZING CRYSTALLINE ALUMINOSILICATE ADSORBENT

CROSS-REFERENCE TO RELATED APPLICATIONS

This application is a continuation-in-part application of copending application Ser. No. 739,176 filed June 24, 1968, now U.S. Pat. No. 3,558,730 issued Jan. 26, 1971, all the teachings of which copending application are incorporated herein by specific reference thereto.

BACKGROUND OF THE INVENTION

Field of the Invention

The field of the art to which the claimed invention pertains is hydrocarbon separation. More specifically, the claimed invention relates to the separation of aromatic hydrocarbons incorporating a solid adsorbent which selectively removes one aromatic component from the feed. The selectively adsorbed aromatic component is recovered from the solid adsorbent through a desorption step.

DESCRIPTION OF THE PRIOR ART

It is known in the separation art that certain crystalline aluminosilicates can be used to separate individual hydrocarbons from mixtures thereof. In the separation of aromatic hydrocarbons the acidic nature of certain crystalline aluminosilicates can be used in a selected manner to separate a desired component of a mixture of aromatic components. This manner of separation is particularly useful where the components to be separated have similar physical properties such as freezing and boiling points. In aromatic hydrocarbon separation and in particular xylene separation, the differences in the acidic nature of the xylene isomers coupled with the acidic nature of the selected crystalline aluminosilicate yields a system which will selectively separate a predetermined xylene from a mixture of xylene isomers.

In adsorptive-separation processes employing molecular sieve adsorbents which display known acidic characteristics, the separation of paraxylene from ortho- and metaxylene can be accomplished by using an adsorbent which is more acidic than paraxylene or an adsorbent which approaches the basic characteristics of the meta- and orthoxylenes. In the former case the more basic meta- and orthoxylene isomers would be preferentially adsorbed within the mol sieve adsorbent leaving a paraxylene enriched external phase and a meta- and orthoxylene enriched adsorbed phase while in the latter case the paraxylene which is more acidic than the ortho- or metaxylene would be preferentially absorbed by the basic adsorbent leaving an external phase enriched in meta- and orthoxylene and a paraxylene enriched adsorbed phase. The separation of the $C_8$ aromatic isomers becomes more involved when ethylbenzene is present together with the ortho-, meta- and paraxylene isomers. The ethylbenzene is considered to be the most acidic $C_8$ aromatic isomer and its presence during adsorptive-separation operations interferes with the ability of most mol sieve adsorbents to efficiently separate paraxylene from meta or orthoxylene or from ortho- and metaxylene isomers. The sodium and calcium forms of both the type X and Y zeolites selectively adsorb meta- and orthoxylene from a mixture of ortho-, meta- and paraxylene; but when ethylbenzene is present with the three xylene isomers, the adsorbent selectively adsorbs paraxylene over the ethylbenzene. This gives an adsorbed phase rich in ortho- and metaxylene but contaminated with paraxylene because of the paraxylene's preferred selectively when compared to ethylbenzene.

I have found that type X and Y zeolite adsorbents which contain certain selected cations provide selectivities which preferentially allow a single component of the $C_8$ aromatic isomers to be adsorbed by the adsorbent without interference from the presence of ethylbenzene during adsorption. The essential feature of my invention resides in employing: (A) cations selected from groups of cations which show preferential adsorption of paraxylene when compared to meta- and orthoxylene; and (B) cations which show preferential adsorption of paraxylene when compared to ethylbenzene.

SUMMARY OF THE INVENTION

It is an object of this invention to provide an adsorptive-separation process for the separation of a selected xylene isomer from a mixture containing at least two $C_8$ aromatic isomers.

In adsorptive-separation processes an important factor that is used to determine the ability of a particular adsorbent to separate components of a feed is the selectivity of the adsorbent for one component as compared to another component. The selectivity (B) as used throughout this specification is defined as the ratio of two components of the adsorbed phase over the ratio of the same two components in the unadsorbed phase at equilibrium conditions and is expressed in equation form in equation 1 below, $$\text{Selectivity} = B_{C/D} = \frac{\text{Vol. \% } C \text{ Vol. \% } DA}{\text{Vol. \% } C \text{ Vol. \% } DU} \quad (1)$$

where C and D are two components of the feed represented in volume percent and the subscripts A and U represent the adsorbed and unadsorbed phases respectively. The equilibrium conditions as defined here were determined when the feed passing over a bed of absorbent did not change composition after contacting the bed of adsorbent, or in other words, there was not net transfer of material occurring between the unadsorbed and adsorbed phases when the selectivity of the two selected components was measured.

As can be seen where the selectivity of two components approaches 1.0 there is no preferential adsorption of one component by the adsorbent. As the absolute value of B becomes greater than unity there is a preferential selectivity by the adsorbent of one component. When comparing the selectivity of component C over component D, a B larger than 1.0 indicates preferential adsorption of component C within the adsorbent while a B less than 1.0 would indicate that component D is preferentially adsorbed leaving an unadsorbed phase richer in component C and an adsorbed phase richer in component D.

In adsorptive-separation processes the separation of para- and metaxylene can be effected through the use of a crystalline aluminosilicate faujasite adsorbent. Common faujasites which can effectively separate the xylene isomers are the synthetically prepared type X and Y zeolites containing selected cations at the exchangeable cationic sites within the zeolite crystal structure.

Both the natural and synthetic aluminosilicates may be used as adsorbents in the present invention. A crystalline zeolitic aluminosilicate encompassed by the present invention for use as an adsorbent includes aluminosilicate cage structures in which the alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Subsequent partial or total dehydration results in crystals interlaced with channels of molecular dimensions. Thus, the crystalline aluminosilicates are often referred to as molecular sieves. In the hydrated form, the crystalline aluminosilicates may be represented by the formula represented in equation 2,

$$M_{2/n}O:Al_2O_3:wSiO_2:yH_2O \quad (2)$$

where M is a cation which balances the electrovalence of the tetrahedra, $n$ represents the valence of the cation, $w$ represents the mols of $SiO_2$, and Y, the mols of water. The cations may be any one of a number of cations such as for example the alkali metal cations or the alkaline earth cations or other selected cations.

Crystalline aluminosilicates which find use as adsorbents in the process of this invention possess relatively well-defined pore structure. The exact type aluminosilicate is generally referred to by the particular silica-alumina ratio and the pore dimensions of the cage structures. The faujasites are commonly represented as type X and type Y aluminosilicates and are defined by their varying silica to alumina ratios.

The zeolite type X can be represented in terms of the mol ratio of oxides as represented in the following equation 3, $$0.9\pm0.2M_{2/n}O:_2O_3:2.5\pm0.5SiO_2:yH_2O \quad (3)$$

where M represents at least 1 cation having the valence of not more than 3, $n$ represents the valence of M, and Y is a value up to about 8 depending upon the indentity of M and the degree of hydration of the crystal. Zeolite type X is described in U.S. Pat. No. 2,882,244.

The type Y zeolite may be represented in the terms of the mol ratio of oxides for the sodium form as represented in the following equation 4, $$0.9\pm Na_2O:Al_2O_3:wSiO_2:yH_2O \quad (4)$$

The exchangeable cationic sites for the type X and Y zeolites, in general, can be defined as represented in equation 2 above as "M." Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange or base exchange methods that the cation exchange may take place using individual solutions of desired cations to be placed on the molecular sieve or can use exchange solutions containing mixtures of the cations which are desired to be exchanged onto the crystalline aluminosilicate zeolite.

The type X and Y zeolite adsorbents containing at their exchangeable cationic sites cations from the group of potassium, rubidium, cesium, barium, copper, silver, lithium, sodium, beryllium, magnesium, calcium, strontium, cadmium, cobalt, nickel, manganese and zinc are preferred for use in the separation process herein disclosed when the preferred adsorption of paraxylene from its isomeric mixtures is to be performed. Improved results, however, can be attained by choosing at least one cation from the group of potassium, rubidium, cesium, barium and silver and at least one cation from the group of lithium, sodium, magnesium, calcium, strontium, beryllium, cadmium, cobalt, nickel, copper, manganese, and zinc. The cations of the former group display a pronounced paraxylene selectivity as compared to meta- and orthoxylene while the cations of the latter group display a pronounced paraxylene selectivity as compared to ethylbenzene. It is, therefore, preferred to employ type X or type Y zeolite adsorbents containing both cations from the former group of cations and cations from the latter group of cations to effectively separate paraxylene from a mixture containing para-, meta-, orthoxylene and ethylbenzene. The type X and Y zeolites which demonstrated the best selectivities for paraxylene separation and which are preferred are those zeolites containing both barium and potassium cations, or potassium and beryllium cations, or potassium and magnesium cations, or rubidium and barium cations, or cesium and barium cations, or potassium and rubidium cations or potassium and cesium cations.

In separating the paraxylene isomer in the process of this invention a bed of solid adsorbent is contacted with a feed mixture, the paraxylene is preferentially adsorbed on the adsorbent, the unadsorbed or raffinate mixture is removed from the adsorbent bed, and the adsorbed paraxylene is removed from the solid adsorbent. The adsorbent can be contained in a single chamber where, through programmed flow into and out of the chamber, a separation of a paraxylene stream is effected. Swing bed operational technique where a series of adsorbent chambers are available or simulated moving bed countercurrent operations similar to the general pattern of operations as disclosed in U.S. Pat. 2,985,589 can be used. In the latter method of operations the selection of a suitable desorbent requires that it be capable of readily displacing adsorbed paraxylene from the adsorbent and also that the paraxylene in the feed mixture be able to displace adsorbed desorbent from a previous desorption step. This requires that a desorbent used in a simulated moving bed process where there is a continuous transfer of paraxylene and desorbent into and out of the adsorbent have a B, when compared to paraxylene, close to unity and preferably slightly less than unity since mass action effects are used to desorb adsorbed paraxylene with the desorbent when collecting paraxylene product and mass action effects are also used to desorb adsorbed desorbent with paraxylene when the paraxylene is being adsorbed on the adsorbent.

The desorbent used in the process of this invention should be a material that is separable from the mixture that is fed to the solid adsorbent. In desorbing the preferentially adsorbed component of the feed both desorbent and the desorbed feed component are removed from the adsorbent bed in admixture, and without a method of separation of these two materials the purity of the selectively adsorbed component of the feed would not be very high. Therefore, it is contemplated that a desorbent that is of a different boiling range than the feed mixture fed to the solid adsorbent be used in this separation process. The use of a desorbent of a differing boiling range would allow fractionation or other separation methods to be used to separate the selectively adsorbed feed component as a relatively pure product stream and allow recovery of the desorbent for possible reuse in the process.

Desorbents which can used in the process of this invention include benzene, toluene, ethers, alcohols, cyclic dienes and the ketones, all of which as preferred to have lower boiling points than paraxylene. Benzene and toluene are particularly preferred desorbents for use in the process of this invention. Gaseous materials such as nitrogen, hydrogen, methane, ethane, etc., can also be used as desorbent materials.

Both liquid and vapor phase operations can be used in the process of this invention. The liquid phase operations are preferred because of the lower temperature requirements and slightly improved selectivities associated with the lower temperatures employed in liquid phase operations. Temperature ranges which can be used in adsorption of the preferred xylene isomer within the adsorbent include the range of from about 40° C. to about 200° C. Pressures preferred in the operation of this invention are included in the range of from about atmospheric to about 500 p.s.i.g. Desorption conditions include the same range of temperatures and pressures as used for adsorption. The desorption of the selectively adsorbed aromatic isomer may be effected at reduced pressures or elevated temperatures or both reduced pressures and elevated temperatures, in which case the desorbent would be used to strip the adsorbed component from the adsorbent.

Feed streams which can be used in the process of this invention comprise at least two components selected from the group of ortho, meta-, paraxylene and ethylbenzene with possible inclusion of portions of straight and branched chain paraffins, cyclo paraffins and aromatics including benzene, toluene, naphthalenes, etc. It is preferred, however, to use feed streams having $C_8$ aromatic isomer concentrations of from about 80 to 100 volume percent of the total feed contacting the adsorbent bed.

In testing various adsorbent the selectivity ($B_{C/D}$) as defined previously was determined using apparatus and procedures as described below. The apparatus used to measure the selectivity of a particular adsorbent consisted of a chamber of approximately 40 cc. volume having inlet and outlet ports at opposite ends of the chamber. The chamber was contained within a temperature controlled heating means and in addition pressure control equipment was used to operate the chamber at a constant predetermined pressure. Attached to the outlet line connected to the outlet of the chamber there was chromatographic analysis equipment which was used to analyze the effluent stream leaving the adsorbent chamber.

The following general procedures were used to determine the B for various adsorbents tested in the chamber. A feed mixture having a known 8⅓ was passed through the adsorbent chamber at paraxylene regulated metaxylene and temperature until the effluent composition flowing from the adsorbent chamber remained at a constant composition indicating that there was no net transfer between the adsorbed phase within the adsorbent and the unadsorbed or external phase surrounding the sorbent particles. A second mixture containing a hydrocarbon which was able to desorb the previously adsorbed component of the feed from the adsorbent was then passed trough the adsorbent chamber. The chromatographic analysis equipment was used to monitor the unadsorbed or external phase and the material desorbed from within the adsorbent. Knowing the compositions of these two streams the B for various components present in the feed stream could be determined.

The feed streams which were used to illustrate the process of this invention in the aforementioned testing apparatus consisted of equal quantities (8⅓ vol. percent each) of ethylbenzene, paraxylene and metaxylene mixed with 2,2,4-trimethylpentane rendering a feed mixture containing 75 vol. percent paraffinic material and 25 vol. percent $C_8$ aromatic isomer material. The $C_8$ aromatic isomers were diluted in the paraffin material to facilitate ease of analyzing the adsorbed and unadsorbed phases for B determination. Orthoxylene was excluded, since its presence would have complicated the analytical procedures, although previous experiences indicated that the orthoxylene isomer behaved substantially the same as the metaxylene isomer. The desorbent material consisted of 25 vol. percent toluene, 74 vol. percent 2,2,4-trimethylpentane and 1 vol. percent neohexane which was used as a tracer to determine desorbent breakthrough in the effluent stream leaving the adsorbent chamber.

The adsorbents used herein to illustrate the process of this invention were originally the sodium type X or type Y zeolites which contained cations as is indicated by their individual description. The adsorbents indicated as containing a single cation were essentially totally ion exchanged and generally contained less than about 2 wt. percent residual sodium based on volatile free adsorbent–that is less than 2 wt. percent residual sodium based on the adsorbent after being subjected to 900° C., calcination temperatures to drive off volatile material. The adsorbents which contained two different cations were also essentially totally ion exchanged and contained the two indicated cations.

EXAMPLE I

In this example, type Y zeolites are used. The zeolite was essentially totally ion exchanged with the indicated cation and was tested for paraxylene/ethylbenzene selectivity ($B_{p-x/EB}$) and for paraxylene/metaxylene selectivity ($B_{p-x/M-x}$) as previously described. The results are indicated in table I below.

TABLE I

| Sieve Description | Selectivity | |
| --- | --- | --- |
| | $B_{p-x/M-x}$ | $B_{p-x/EB}$ |
| Group IA Metals: | | |
| Type Y, lithium exchanged | 0.72 | 1.52 |
| Type Y, sodium exchanged | 0.75 | 1.32 |
| Type Y, potassium exchanged | 1.83 | 1.16 |
| Type Y, rubidium exchanged | 1.51 | 0.96 |
| Type Y, cesium exchanged | 1.50 | 0.80 |
| Type X, sodium exchanged | 1.02 | 1.15 |
| Group IIA Metals: | | |
| Type Y, beryllium exchanged | 0.91 | 1.08 |
| Type Y, magnesium exchanged | 0.59 | 1.67 |
| Type Y, calcium exchanged | 0.35 | 1.17 |
| Type Y, strontium exchanged | 0.44 | 1.40 |
| Type Y, barium exchanged | 1.27 | 1.85 |
| Others | | |
| Type Y, nickel exchanged | 0.70 | 1.27 |
| Type Y, copper exchanged | 0.62 | 1.46 |
| Type Y, silver exchanged | 1.02 | 1.19 |
| Type Y, manganese exchanged | 0.66 | 1.25 |
| Type Y, cadmium exchanged | 0.61 | 1.19 |

As can be seen from the data above, the only single cation exchanged adsorbents which could be used for paraxylene separation from streams containing metaxylene and ethylbenzene are potassium, barium, sodium and silver exchanged zeolite adsorbents.

EXAMPLE II

In this example the zeolite was essentially totally ion exchanged with an aqueous mixture containing the two cations desired to be placed on the zeolite adsorbent. The adsorbents which contained both Group IA and Group IIA cations were ion exchanged in a manner which resulted in a mol ratio of the Group IIA metal over the Group IA metal of about 3:1 while the adsorbents containing the Group IA metals combination were exchanged in a manner which resulted in a mol ratio of the two Group IA metals of about 1:1. The copper-potassium sieve tested contained a mol ratio of copper over potassium of about 3:1. The adsorbents were tested in accordance with the previously described procedures and the results of the test are reported in table II below.

TABLE II

| Sieve Description | Selectivity | |
| --- | --- | --- |
| | $B_{p-x/M-x}$ | $B_{p-x/EB}$ |
| Group IA+IIA Metals: | | |
| Type Y, K+Ba exchanged | 3.76 | 2.10 |
| Type Y, K+Be exchanged | 2.11 | 1.44 |
| Type Y, K+Mg exchanged | 2.25 | 1.41 |
| Type Y, Rb+Ba exchanged | 2.05 | 1.41 |
| Type Y, Cs+Ba exchanged | 1.57 | 1.30 |
| Type X, K+Ba exchanged | 2.49 | 2.03 |
| Group IA Metals: | | |
| Type Y, K+Rb exchanged | 1.80 | 1.06 |
| Type Y, K+Cs exchanged | 1.79 | 1.03 |

As can be seen in table II, the combination of the Group IA and Group IIA metals tested all displayed the ability to separate paraxylene from a mixture containing all the $C_8$ aromatic isomers.

There appears to be a synergistic effect produced by coexchanging certain Group IA and Group IIA metals that is particular to these two classes of elements. The barium and potassium coexchanged adsorbents shown in table II display greater selectivities for paraxylene than either the single cation exchanged barium or potassium adsorbents shown in table II.

An adsorbent analysis of the type X, K+Ba exchanged adsorbent tested in example II is shown in table III below.

TABLE III
Type X, K+Ba Coexchanged Adsorbent
Chemical analysis based on volatile free adsorbent:

| | | |
| --- | --- | --- |
| Na, wt. % | 0.7 | |
| K, wt. % | 3.7 | |
| Ba, wt. % | 19.1 | |
| $SiO_2/Al_2O_3$ mol ratio | 2.4 | |
| Volatile material driven off at 500° C., wt. % | 14.7 | |
| Physical analysis: | | |
| Surface Area, m.²/g. | | 415 |
| Pore Volume, cc./g. | | 0.24 |
| Apparent Bulk Density (ABD), g./cc. | | 0.835 |
| Particle Size | | |
| U.S. 20– , wt. % | 0.0 | |
| 20–30, wt. % | 32.9 | |
| 30–40, wt. % | 44.5 | |
| 40–50, wt. % | 21.1 | |
| 50–60, wt. % | 0.7 | |
| 60– , wt. % | 9.8 | |

PREFERRED EMBODIMENTS

In accordance with an embodiment of the present invention, there is provided a process for separating at least one $C_8$ aromatic isomer from a feed mixture containing a mixture of $C_8$ aromatic isomers which process employs a crystalline aluminosilicate absorbent selected from the group consisting of type X and type Y zeolites containing at least one cation selected from the group consisting of potassium, rubidium, cesium, barium, copper, silver, lithium, sodium, beryllium, magnesium, calcium, strontium, cadmium, cobalt, nickel, manganese and zinc, which process comprises the steps of: (a) contacting the feed mixture with a bed of the crystalline aluminosilicate absorbent at adsorption conditions to effect the selective absorption of a first $C_8$ aromatic component; (b) withdrawing from the bed of solid absorbent a stream comprising a less selectively absorbed mixture of the feed; (c) contacting the absorbent bed at desorption conditions with a desorbent material to effect removal of the selectively absorbed first $C_8$ aromatic component from within the absorbent; and, (d) withdrawing from the solid absorbent bed a stream comprising desorbent material and said first $C_8$ aromatic component.

I claim as my invention:

1. A process for separating paraxylene from a feed mixture of $C_8$ aromatic isomers including paraxylene and ethylbenzene which comprises contacting said mixture with a single cation exchanged crystalline aluminosilicate absorbent selected from the group consisting of type X and type Y zeolites, said cation being selected from the group consisting of potassium, barium, sodium and silver, thereby selectively absorbing said paraxylene.

2. The process of claim 1 further characterized in that said cation is potassium.

3. The process of claim 1 further characterized in that said cation is barium.

4. The process of claim 1 further characterized in that said cation is sodium.

5. The process of claim 1 further characterized in that said cation is silver.

6. The process of claim 1 further characterized in that said feed mixture contains metaxylene.

7. The process of claim 1 further characterized in that said feed mixture contains orthoxylene.

8. The process of claim 1 further characterized in that said feed mixture contains orthoxylene and metaxylene.

9. The process of claim 1 further characterized in being effected at a temperature within the range of from 40° C. to about 200° C. and a pressure within the range of from about atmospheric to about 500 p.s.i.g.

10. The process of claim 9 further characterized in being effected in the liquid phase.

11. The process of claim 1 further characterized in that said absorbent is a type X-type zeolite.

12. The process of claim 1 further characterized in that said absorbent is a type Y-type zeolite.

13. A process for separating paraxylene from a mixture of $C_8$ aromatic isomers including paraxylene and ethylbenzene which comprises contacting said mixture with a crystalline aluminosilicate absorbent selected from the group consisting of type X and type Y zeolites and containing both a first cation and a second cation at exchangeable cationic sites within the absorbent crystalline structure, said first cation being selected from the group consisting of potassium, rubidium, cesium, barium and silver, and said second cation being selected from the group consisting of lithium, sodium, magnesium, calcium, strontium, beryllium, cadmium, cobalt, nickel copper, manganese, and zinc, thereby selectively absorbing said paraxylene.

14. A process for separating paraxylene from a mixture of $C_8$ aromatic isomers including paraxylene and ethylbenzene which comprises contacting said mixture with a crystalline aluminosilicate absorbent selected from the group consisting of type X and type Y zeolites and containing a pair of cations at exchangeable cationic sites within the absorbent crystalline structure, said cation pair being selected from the group consisting of potassium and beryllium, potassium and magnesium, rubidium and barium, cesium and barium, potassium and rubidium, and potassium and cesium, thereby selectively absorbing said paraxylene.

15. The process of claim 14 further characterized in that said cation pair is potassium and beryllium.

16. The process of claim 14 further characterized in that said cation pair is potassium and magnesium.

17. The process of claim 14 further characterized in that said cation pair is potassium and rubidium.

18. The process of claim 14 further characterized in that said cation pair is potassium and cesium.

19. The process of claim 14 further charaterized in that said cation pair is rubidium and barium.

20. The process of claim 14 further characterized in that said cation pair is cesium and barium.

* * * * *